United States Patent [19]

Bonny et al.

[11] Patent Number: 5,765,878
[45] Date of Patent: Jun. 16, 1998

[54] SLIDE-FIT PIPE COUPLING

[75] Inventors: Pierre Bonny, Hamburg; Thorsten Sternal, Moisburg, both of Germany

[73] Assignee: Mercedes Benz AG, Stuttgart, Germany

[21] Appl. No.: 794,996

[22] Filed: Feb. 5, 1997

[30] Foreign Application Priority Data

Feb. 17, 1996 [DE] Germany ............... 196 06 003.6

[51] Int. Cl.⁶ ............................. F16L 39/00; F16L 39/04
[52] U.S. Cl. ..................... 285/123.1; 285/123.15; 285/9.2; 285/905
[58] Field of Search ............. 285/233, 9.2, 13, 285/14, 261, 921, 905, 123.1, 123.15, 120, 113

[56] References Cited

U.S. PATENT DOCUMENTS

| 237,544 | 2/1881 | Jonson | 285/123.1 |
| 313,393 | 3/1885 | Westinghouse | 285/123.1 |
| 1,415,587 | 5/1922 | Layne et al. | 285/123.1 |
| 2,113,204 | 4/1938 | Wasser | 285/123.1 |
| 2,202,459 | 5/1940 | Link | 285/9.2 |
| 2,981,072 | 4/1961 | Brewington | 285/13 |
| 3,215,455 | 11/1965 | Fiala et al. | 285/233 |
| 3,724,878 | 4/1973 | Ford | 285/233 |
| 4,127,286 | 11/1978 | Albertsen | 285/123.1 |
| 4,553,775 | 11/1985 | Halling | 285/261 |
| 4,597,596 | 7/1986 | Tozer | 285/233 |
| 4,613,170 | 9/1986 | Kersting | 285/233 |
| 5,174,610 | 12/1992 | Svendsen et al. | 285/13 |
| 5,269,650 | 12/1993 | Benson | 285/9.2 |
| 5,328,213 | 7/1994 | Barth | 285/123.1 |

FOREIGN PATENT DOCUMENTS

| 73361 | 9/1949 | Denmark | 285/120 |
| 0 232 953 | 6/1989 | European Pat. Off. | |
| 0 503 580 | 9/1992 | European Pat. Off. | |
| 36 14 180 | 11/1986 | Germany . | |
| 594227 | 5/1959 | Italy | 285/921 |
| 117001 | 7/1918 | United Kingdom | 285/22 |
| 1 136 698 | 12/1968 | United Kingdom . | |
| 2194302 | 3/1988 | United Kingdom | 285/120 |

*Primary Examiner*—Eric K. Nicholson
*Attorney, Agent, or Firm*—Klaus J. Bach

[57] ABSTRACT

In a pipe coupling between first and second pipe sections having end areas received within one another, one of the end areas has radial projections which are arranged circumferentially around its outer or inner circumference and extend toward the inner or outer surface of the other end area which has a smooth cylindrical surface adjacent the projections to permit sliding and some tilting of the pipe sections relative to each other.

4 Claims, 3 Drawing Sheets

SLIDE-FIT PIPE COUPLING

BACKGROUND OF THE INVENTION

The invention relates to a slide-fit pipe coupling wherein an end area of a first pipe is received in a mating end of a second pipe by means of a slide fit arrangement. Such pipe couplings are used for example for the interconnection of various pipe sections in exhaust gas systems of motor vehicles.

DE 36 14 180 A1 for example discloses various types of slide-fit pipe couplings for exhaust gas pipe systems of motor vehicles. In a first type, the end of a first pipe is received in the end of a second pipe which is radially widened so as to form an annular gap between the first and the second pipe. During engine operation, the gap is closed by a hot exhaust gas stream which heats the inner pipe so that it expands while the outer pipe, cooled by the surrounding air, remains cooler and consequently expands only to a much lesser degree than the inner pipe. During engine operation, the end areas of the pipes are therefore in abutting engagement along the overlapping surface area. In a second embodiment, wherein an end area of a first pipe is also received in a radially expanded end area of a second pipe, the second pipe is expanded to such a degree that a gap remains between the overlapping end areas also during engine operation and a seal is disposed in the gap for sealing the gap. In order to prevent a dislocation of the seal, the end of the first pipe is provided with a circumferential bulge which retains the seal.

The patent publication EP 0 232 953 B1 discloses a low-stress exhaust pipe arrangement for an internal combustion engine wherein particular sections of an inner protective pipe system which is supported within an outer cast jacket, have end portions of the same diameter with end faces which abut one another or are arranged at a small distance from one another and which are received in a surrounding connecting sleeve supported in the jacket. The connecting sleeve comprises a short and a longer sleeve portion each of which is received in a respective recess formed at the inside of the surrounding jacket. Each of the two end areas of the pipes which are received in the connecting sleeve includes a radially outwardly projecting annular bulge of which one abuts the short sleeve portion and the other abuts the longer sleeve portion. The longer connecting sleeve portion extends axially across the gap between the two end areas. The radially outwardly projecting annular bulges at the ends of the pipes provide for a thermally insulating annular gap between the inner pipe sections and the surrounding jacket since the inner pipe sections engage the respective connecting sleeve area only at their ends and are not in direct contact with the outer jacket as they are supported in spaced relationship therefrom by the sleeves.

It is the object of the present invention to provide a pipe coupling which permits not only relative axial movement between the joined pipe sections, but which permits also tilting of the pipe sections relative to each other without detrimentally affecting the slide joint properties.

SUMMARY OF THE INVENTION

In a pipe coupling between first and second pipe sections having end areas received within one another, one of the end areas has radial projections which are arranged circumferentially around its outer or inner circumference and extend toward the inner or outer surface of the other end area which has a smooth cylindrical surface adjacent the projections to permit sliding and some tilting of the pipe sections relative to each other.

With this slide-fit pipe coupling, contact is established between the two overlapping pipe end sections along a circumferential circular line. The line of contact is defined by the height of a radially outwardly extending projection formed at the outside of the inner end section or by the smallest inner diameter, that is the distance between opposite inwardly extending projections, formed on the end area of the outer pipe section. The radially outwardly or inwardly extending projections are such that the slide-fit by which the pipe sections are joined is formed by not more than a circumferential line of contact between the end areas of the pipe sections which permits a certain amount of tilting of the pipe sections relative to each other without resulting in jamming which would inhibit the relative axial expansion of the pipes joined by the coupling arrangement. Such tilting cannot be obtained with pipe couplings presently in use wherein the pipe sections coupled are in engagement with each other over a certain axial length of the end sections of the pipes being joined.

In a particular embodiment of the invention, the projection extends annularly fully around a pipe end area.

In an alternative embodiment, a plurality of projections are arranged around a pipe end area in circumferentially spaced relationship.

In another embodiment, the pipe end area has an annular projection which is in contact with the adjacent opposite pipe end area along a circumferential line and an annular gap is formed between the circumferential projection and the adjacent surface of the opposite pipe end. Such a pipe coupling is advantageous for use in exhaust gas systems, since during the heat up phase as well as during normal operation, the expansion states at the one and at the other pipe end areas are different at; it is possible for example that the pipe ends consist of materials with different expansion coefficients or that they have different masses. Such differences can be compensated for by providing a certain gap. The gap is so selected that the pipe ends do not interlock so that they remain slideable within one another.

Preferred embodiments of the invention are shown in the drawings and will be described below.

DESCRIPTION OF PREFERRED EMBODIMENTS

Figure 1:
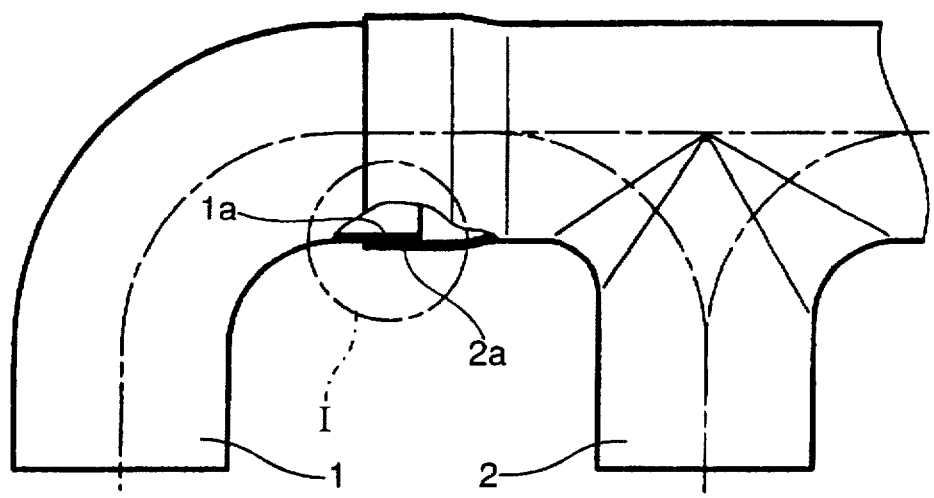
FIG. 1 is a schematic side view of part of an exhaust gas conduit system for a motor vehicle with two pipe sections interconnected by a slide-fit pipe coupling.

FIG. 1 shows schematically a slide-fit pipe coupling by which a first pipe section 1 in the form of an elbow is interconnected with a second pipe section 2 which is in the form of a T-piece. Both pipe sections 1 and 2 are part of an exhaust gas pipe system of a motor vehicle which is not shown. As can be seen from FIG. 1, the slide-fit pipe coupling is realized by receiving an end area 1a of the first pipe section 1 within the adjacent end area 2a of the second pipe section 2 which is slightly widened for that purpose. The pipe diameter in the remaining part of the second pipe section 2 is unchanged and corresponds to that of the first pipe section 1.

Figure 2:
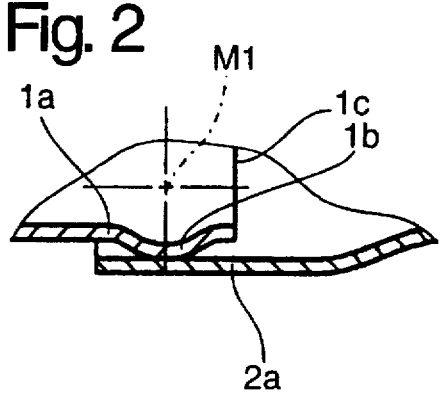
FIG. 2 is a cross-sectional view of the portion of FIG. 1 enclosed in the circle I showing a first slide-fit structure.
Figure 3:
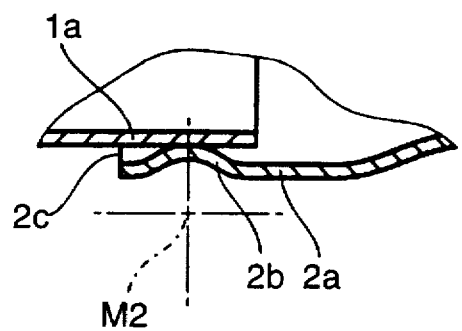
FIG. 3 is a view corresponding to that of FIG. 2 showing however a second slide-fit structure.

FIGS. 2 and 3 show details of two different embodiments of the arrangement of a slide-fit coupling which is shown in FIG. 1 only schematically. In this embodiment, the overlapping pipe end sections 1a, 2a (elbow) of the pipe section 1 on one hand and the pipe section 2 (T-piece) on the other hand are designated in the two FIGS. 2 and 3 with the same reference numerals inspite of the somewhat different shapes in order to establish the appropriate relationship to FIG. 1 in a simple manner. In the embodiment of FIG. 2, the end area 2a which is radially expanded with regard to the rest of the pipe section 2 and which receives the end area 1a of the pipe section 1 has a constant inner diameter.

In contrast, the end area 1a of the pipe section 1 includes a radially outwardly projecting annular bulge projecting from the otherwise constant diameter area which, in the shown cross-sectional plane, extends in a circular area from the surface of the pipe end area. The center of curvature M1 of the arc is in radial direction disposed between the longitudinal axis and the inner wall of the pipe section and, in axial direction, at a distance from the respective front end face 1c of the pipe section 1 within the axial extent of the pipe end area 1a. In the slide-fit coupling embodiment of FIG. 3, the end area 1a of the pipe section 1 which is received in the end area 2a of the pipe section 2 is flat cylindrical that is, it has a constant outer diameter whereas the radially expanded end area 2a of the pipe section 2 has a radially inwardly projecting annular bulge in the form of a radially inwardly impressed bulge 26. In the longitudinal cross-section as shown in FIG. 3, the bulge 2b has a circular arc-like shape with a center of curvature M2 which is disposed radially outside of the pipe circumference and in axial direction at a distance from the adjacent front end 2c of the pipe section 2 but within the axial extent of the pipe end area 2a.

As can be seen from FIGS. 2 and 3, the amount by which the radial projection 1b extends in radial direction maximally over the outer surface of the rest of the pipe section area 1a or by which the bulge impression 2b projects into, and narrows, the diameter of the receiving pipe end area 2a is so selected that the inner pipe end area 1a and the outer (receiving) pipe end area 2a are in contact essentially only along a circular line which is disposed in a plane normal to the pipe axis in which the bulge 1b provides for the largest outer diameter or the bulge 2b provides for the smallest inner diameter. As can further be seen from FIGS. 2 and 3, the inner pipe end area 1a can be moved axially within the outer pipe end area 2a as necessary while the line of contact between the overlapping pipe end areas is maintained. The pipe diameters of the pipe end areas 1a, 2a involved in the sliding fit are so selected that the receiving outer pipe end area 2a engages the inner pipe end area 1a along the line of contact with a certain radial contact force. Since the bulge 1b or respectively, the bulge 2b will always return, in the direction of the adjacent pipe front face 1c, 2c, each again to the original pipe diameter, the inner pipe end area 1a can be axially inserted into the outer pipe end area 2a without any problem.

Figure 4:
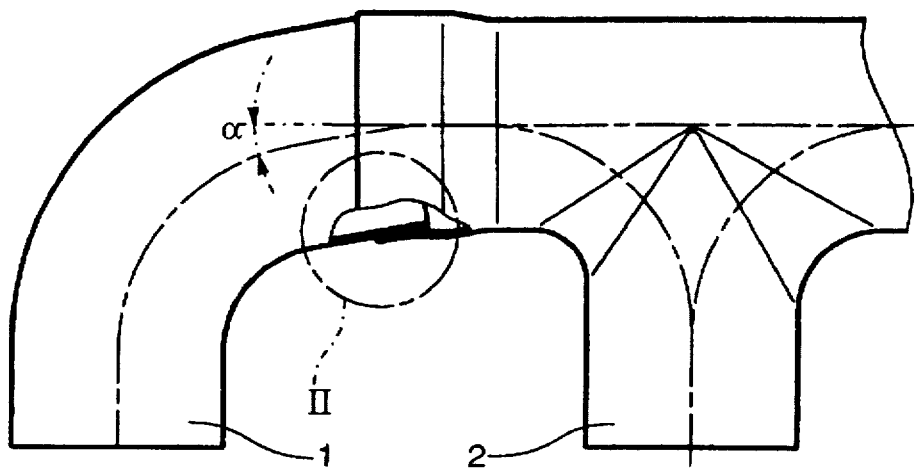
FIG. 4 is a view corresponding to that of FIG. 1 wherein the pipe sections are arranged however at an angle to one another.
Figure 5:
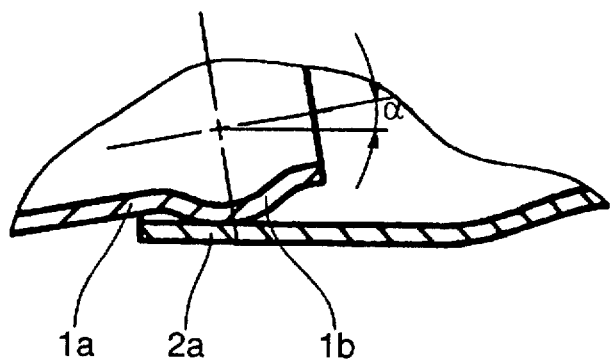
FIG. 5 is a cross-sectional view of the portion of FIG. 4 enclosed in the circle II of FIG. 4 with the slide-fit structure of FIG. 2.
Figure 6:
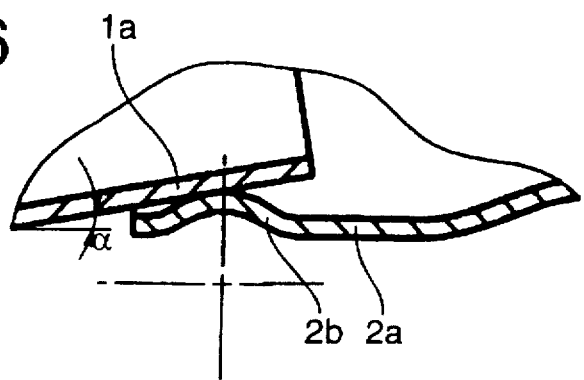
FIG. 6 is a view corresponding to that of FIG. 5 however wit the slide-fit structure of FIG. 3.

The slide-fit pipe couplings, which are shown with an engagement of the overlapping pipe end areas 1a, 2a along only a circular line in a plane essentially normal to the pipe axis, have the advantage, when compared with a full surface engagement of the prior art slide-fit couplings, that the interconnected pipe sections 1, 2 can be disposed at an angle but still do not jam such that even in this situation, the pipe sections can expand relative to one another in the coupling area in order to accommodate for example varying thermal loads. This is explained in detail on the basis of FIG. 4b. FIG. 4b shows the joined tube sections of FIG. 1, that is when the tube section 1 and the tube section 2 are inclined relative to each other such that, in the area of the slide-fit coupling, the axis of the pipe section 1 and the axis of the pipe section 2 are disposed at an angle α which is greater than 0. FIGS. 5 and 6 show the resulting inclined position for the slide-fit coupling embodiments of FIG. 2 and, respectively, FIG. 3.

As can be seen from FIG. 5, the annular bulge 1b permits the tilting of the pipe end area 1a with respect to the pipe end area 2a in which it is received by a tilting angle α without causing jamming of the overlapping end areas 1a, 2a and without bending of one of the two pipe end areas 1a, 2a as long as the tilt angle α remains below an admissible maximum value. This is possible since the outer pipe end 2a slides with its inner wall along the outer surface of the bulge 1b whereby firm engagement between the outer pipe section area 2a with the top surface of the bulge 1b of the inner pipe end area 1a is maintained. The corresponding conditions are present in an analog manner for the cooperating pipe end sections 1a, 2a in the slide fit couplings as shown in FIG. 6. In this case, the inner pipe end area 1a slides along the radially inner surface of the radially inwardly projecting bulge 2b whereby the outer surface of the inner pipe end area remains in engagement with the bulge surface which is arced in the axial direction of the outer pipe end section 2a. Also, in this case, the engagement along a circular line of the outer pipe end area 2a, that is the annular bulge 2b thereof, with the outer surface of the inner pipe end area 1a in a plane essentially normal to the axis of the outer pipe section is maintained without jamming of the overlapping pipe sections as long as the inclination of the pipe end section areas 1a, 2a relative to one another remains below a predetermined maximum value.

Figure 7:
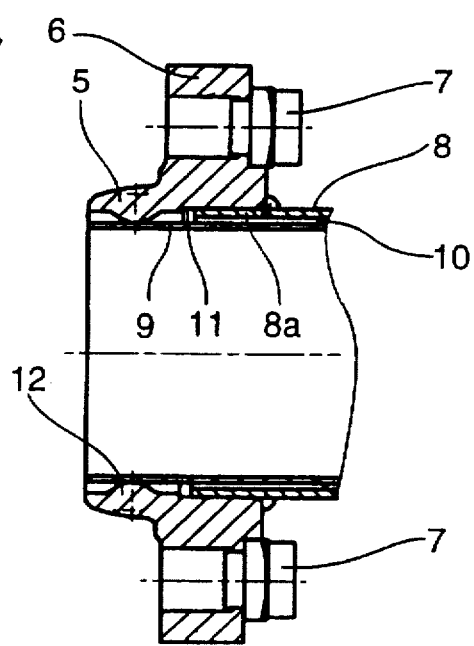
FIG. 7 shows in an axial cross-sectional view of a connecting area of an exhaust gas manifold of a motor vehicle engine with a slide fit pipe coupling.

FIG. 7 shows another example of a slide-fit pipe coupling according to the invention for the connecting area of an air gap-insulated exhaust gas manifold of an exhaust gas system for a motor vehicle. This connecting area includes a pipe sleeve 5 enclosing a pipe and having a radial flange 6 formed integrally therewith. The radial flange 6 has several bores for bolt connections 7 for mounting purposes.

The pipe sleeve 5 receives a continuous inner pipe 9 and the end area 8a of a protective pipe 8 which surrounds the inner pipe 9 coaxially in spaced relationship so as to form an insulating air gap 10. The protective pipe 8 extends up to an annular shoulder 11 formed at the inner wall of the pipe sleeve 5. Within an area which is not covered by the protective pipe 8, the pipe sleeve 5 has a radially inwardly extending annular arced projection 12 with which the inner pipe 9 is in line-contact around its circumference in a plane essentially normal to the axis of the pipe 9 along which the annular arced projection 12 provides the smallest inner diameter in the direction of the axis of the pipe 9.

In this manner, a slide-fit coupling is provided for the inner pipe 9 in the pipe sleeve 5 which not only permits axial movement of the inner pipe 9 with respect to the pipe sleeve 5 but also permits a certain tilting of the two components 5, 9 relative to each other. Also, the properties of this slide-fit coupling with respect to supporting the inner pipe 9 in the pipe sleeve 5 and sealing the area between the inner pipe 9 and the pipe sleeve 5 are maintained as long as the tilting angle is not excessive. Particularly, this slide-fit pipe coupling with circular line engagement of the inner pipe 9 permits, because of the annular projection 12, a certain sliding movement and tilting of this inner pipe 9 relative to the pipe sleeve 5 receiving the inner pipe 9 to a small degree as it typically occurs in such air gap-insulated exhaust gas manifolds of motor vehicles.

Figure 8:
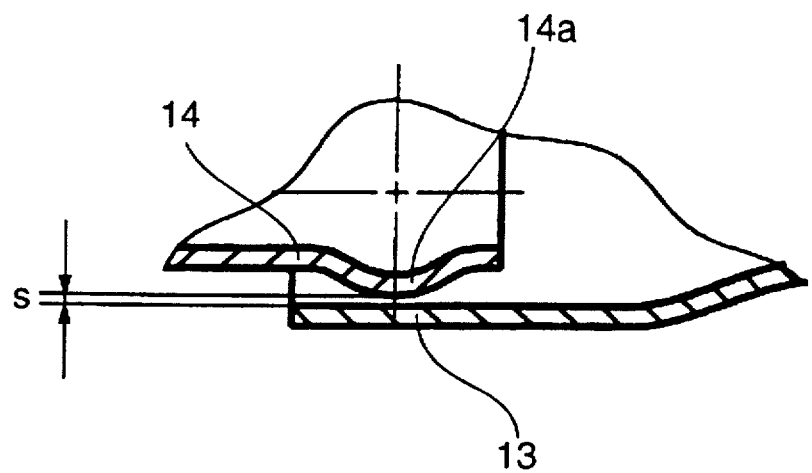
FIG. 8 is a view corresponding to that of FIG. 2 however with a slide-fit structure having a circumferential gap between the pipe sections being joined.

FIG. 8 shows another embodiment of the slide-fit pipe coupling as shown in FIG. 2. In this embodiment, a pipe section with expanded pipe end area 13 and a pipe end area 14 received in the pipe end area 13 are provided wherein the pipe end area 14 has a radially outwardly projecting annular bulge 14a. In contrast to the embodiment of FIG. 2, however, the annular bulge 14a of the arrangement of the slide-fit pipe coupling is disposed on the outer pipe end area in spaced relationship so that a circumferential annular gap of predetermined width S is maintained. This facilitates mounting in many cases in which the pipe coupling does not need to seal. If such a pipe coupling is used in a motor vehicle exhaust gas system a circumferential radial gap has the additional advantage that different expansion between the two pipe end areas 13, 14, for example because of the use of different materials with different expansion coefficients or because of relatively large mass differences between the joined pipe end areas 13, 14, can be accommodated without jamming of the pipe components which would prevent slide movements of the pipe components. A corresponding joining of the pipe end areas with a gap between the joined area is of course also possible for the slide-fit pipe coupling of FIG. 3 in an analog manner.

Figure 9:
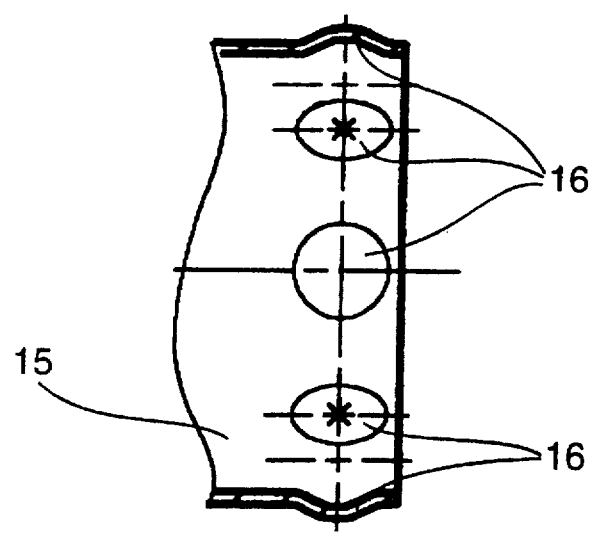
FIG. 9 is a cross-sectional view of the end section of a pipe with embossed spacing dimples providing for another slide fit coupling.

FIG. 9 shows a slide-fit pipe coupling according to the invention with a pipe end area 15 with radial projections which are circumferentially not continuous as they are in the preceding embodiments but which consist of several circumferentially evenly spaced impressed projections 16 of which five are shown in the side view of FIG. 9. The projections 16 project in the shown example dome-like from a circular base line radially outwardly. The pipe end area 15 provided with these spacing projections 16 may be inserted into an outer pipe end area such as shown in FIGS. 2 and 8 for the realization of a slide-fit coupling according to the invention. Of course, if desired an outer pipe end area may be provided, instead of a circumferentially extending radially inwardly projecting bulge as shown in FIG. 3, with several circumferentially equally spaced radially inwardly impressed spacing projections.

The use of a slide-fit pipe coupling according to the invention however, is not limited to the examples described herein and not to exhaust gas systems but may be utilized wherever two pipes are to be joined in such a way that they can be tilted relative to each other to a certain degree and axially moved relative to each other while the desired circumferential engagement between the two overlapping pipe end areas is maintained.

What is claimed is:

1. A pipe coupling between inner and outer pipe sections, said inner pipe section having an end area received within an end area of the outer pipe section, said pipe coupling including a pipe sleeve with an annular radial flange, said sleeve having at one end an inner diameter corresponding to the outer diameter of said outer pipe section for slideably receiving said outer pipe section and, spaced from said one end, a reduced diameter area forming an inner shoulder for limiting the insertion distance for said outer pipe section into said pipe sleeve, and, in axially spaced relationship therefrom, an inwardly extending annular projection structure, which is arched in axial directions, said inner pipe section having, adjacent said projection, a smooth straight cylindrical surface in line contact with said inwardly extending annular projection, and said outer pipe section being a protective pipe and extending into said flange into engagement with said shoulder and being supported in said flange in spaced relationship from said inner pipe section.

2. A pipe coupling according to claim 1, wherein said projection structure consists of an annular circumferentially extending bulge arched in axial direction and forming a circular line of contact with said inner pipe section.

3. A pipe coupling according to claim 1, wherein said radial projection structure extends from said pipe sleeve into firm contact with the respective smooth surface of said inner pipe section.

4. A pipe coupling according to claim 1, wherein, in axial direction of said pipe sleeve, said projection structure is arched in such a way that in an axial cross section its outer surface defines a circular arc.

* * * * *